US007021795B2

(12) United States Patent
Coates et al.

(10) Patent No.: US 7,021,795 B2
(45) Date of Patent: Apr. 4, 2006

(54) ILLUMINATION APPARATUS

(75) Inventors: Nicholas Richard Coates, Crowborough (GB); Anirudh Luthra, Burgess Hill (GB)

(73) Assignee: SEOS Limited, West Sussex (GB)

( * ) Notice: Subject to any disclaimer, the term of this patent is extended or adjusted under 35 U.S.C. 154(b) by 19 days.

(21) Appl. No.: 10/472,739

(22) PCT Filed: Jan. 10, 2003

(86) PCT No.: PCT/GB03/00067

§ 371 (c)(1), (2), (4) Date: Sep. 23, 2003

(87) PCT Pub. No.: WO03/063477

PCT Pub. Date: Jul. 31, 2003

(65) Prior Publication Data

US 2004/0125601 A1 Jul. 1, 2004

(30) Foreign Application Priority Data

Jan. 23, 2002 (GB) ............................................ 0201496

(51) Int. Cl.
*F21V 13/00* (2006.01)

(52) U.S. Cl. ........................ 362/286; 362/269; 362/277

(58) Field of Classification Search ................. 362/286, 362/285, 269, 271, 272, 277; 372/24, 25
See application file for complete search history.

(56) References Cited

U.S. PATENT DOCUMENTS

| | | | | |
|---|---|---|---|---|
| 3,346,299 A | | 10/1967 | Meyer | |
| 3,713,143 A | | 1/1973 | Blitz | |
| 4,357,771 A | * | 11/1982 | Olds | 40/444 |
| 4,641,182 A | * | 2/1987 | Gur | 348/61 |
| 5,127,056 A | * | 6/1992 | Storaasli | 704/276 |
| 5,202,957 A | * | 4/1993 | Serrao | 348/14.15 |
| 5,742,421 A | | 4/1998 | Wells et al. | |
| 6,654,151 B1 | | 11/2003 | Yamaguchi | |
| 6,665,326 B1 | * | 12/2003 | Kusunose | 372/57 |

FOREIGN PATENT DOCUMENTS

| | | | |
|---|---|---|---|
| DE | 1914730 A | | 10/1970 |
| DE | 4424887 A | | 1/1995 |
| DE | 10030417 A | | 4/2001 |
| EP | 0301870 A | | 1/1989 |
| EP | 0 301 870 | * | 2/1989 |
| GB | 2126042 A | | 3/1984 |
| GB | 2280059 | | 1/1995 |
| JP | 10-240182 | | 9/1998 |
| WO | 00/33727 | | 6/2000 |

* cited by examiner

*Primary Examiner*—John Anthony Ward
*Assistant Examiner*—Mark Tsidulko
(74) *Attorney, Agent, or Firm*—Iandiorio & Teska

(57) ABSTRACT

Illumination apparatus (8) which comprises at least two light sources, at least one light collecting device for collecting light from the light sources (10), motion providing means for providing relative motion between the light sources (10) and the light collecting device (14), and control means for controlling the illumination of the light sources (10) such that the light sources (10) are illuminated for a predetermined time period when in a predetermined position relative to the light collecting device (14).

15 Claims, 11 Drawing Sheets

ILLUMINATION APPARATUS

FIELD OF THE INVENTION

This invention relates to illumination apparatus for projecting light.

BACKGROUND OF THE INVENTION

Known projectors often accomplish image projection by passing light through a panel which has an image on it, or by reflecting light off a panel which has an image on it. The image may be formed in photographic emulsion. Alternatively, the image may be formed by controlling the polarisation of pixel elements such that light is passed or absorbed according to the intensity required to form the image. A further alternative involves the use of moveable micro-mirrors or oil films that may be used to direct light to an aperture or absorbing light dump. In some of these known devices, the panel is able to modulate all colours so that a coloured image may be formed. In others of the known devices, three panels are used to modulate red, blue and green light separately. A further method is for one panel or two panels to modulate the three colours in rapid sequence, this being known as field sequential colour.

The known projectors comprise a light source, collector means for collecting the light and focusing it into a beam, and an optical train which directs the light to the panel. In some cases, the light is split into three colours on the way. The light is transmitted through or reflected from the panel, and then it exits the illumination apparatus through a lens system which is designed to cast the image onto a screen. The transmission of light in this manner is generally fairly inefficient. More specifically, light beams can be considered as a collection of rays propagating at a range of angles rather than a bunch of parallel rays. If optical components are used to widen or narrow a beam, it is found that the product of the solid angle subtended by the rays in the beam and the cross-sectional area of the beam remains constant. Any aberration or inefficiency in the optical components has the effect of increasing this value, which is known as etendue. The etendue of a beam of light can only be decreased at the expense of energy in the beam, In any light path, there may be one optical component whose etendue is the smallest, thus limiting the maximum amount of light that can propagate through the apparatus. It is preferable therefore to use a light source with a minimum etendue, as then the entire optical beam can be coupled into a small area of high f-number. Such a source would have a volume, which was as small as possible. This is why arc lamps are currently the most popular source of illumination for projectors.

Some kinds of light source including light emitting diodes and arc lamps but not filament lamps have the ability to produce light at a much higher intensity when operated for a short duration, compared with their maximum continuous output. When operated in flashing mode at a given mark space ratio, the average light output may be the same as or less than the continuous output but the instantaneous output during the flash is high.

It is an aim of the present invention to provide improved illumination apparatus for example for projection.

SUMMARY OF THE INVENTION

Accordingly, the present invention provides illumination apparatus which comprises at least two light sources, at least one light collecting device for collecting light from the light sources, motion providing means for providing relative motion between the light sources and the light collecting device, and control means for controlling the illumination of the light sources such that the light sources are illuminated for a predetermined time period when in a predetermined position relative to the light collecting device, and such that the light sources are illuminated for a fraction of a cycle time with a drive current greater that the average forward current for the light sources when illuminated continuously.

The illumination apparatus of the present invention may be able to provide results which improve average and instantaneous light output from various types of light sources such for example as light emitting diodes, ultra high performance lamps, organic light emitting diodes, laser diodes and arc lamps.

The illumination apparatus may be one in which the light sources are stationary, and in which the light collecting device is moveable relative to the stationary light sources.

Alternatively, the illumination apparatus may be one in which the light collecting device is stationary, and in which the light sources are moveable relative to the stationary light collecting device.

The illumination apparatus may still further alternatively be one in which the light sources and the light collecting device are both moveable in either the same direction or in opposite directions.

With moveable optics, the illumination apparatus may provide modulated moving light sources, which may be used for illumination purposes such for example as in display systems.

The light sources may be arranged on a drum, a disc or a belt.

Each light source may be a light emitting diode. The use of light emitting diodes enables the light sources to be kept small and, for example, smaller than arc lamps. The use of light emitting diodes provides small light sources which additionally have an extremely long life (nearing 100,000 hours) and which have a low power consumption and the ability of being colour specific. Recently, light emitting diodes have become available that can emit up to or greater than 25 lumens.

The light sources may produce light of the same colour. Alternatively, the light sources may produce light of different colours.

The illumination apparatus may be one in which the light sources produce light of different colours, and in which the light sources are arranged according to a type of panel used in the illumination apparatus in order to provide sequentially coloured light.

In an alternative arrangement, the light sources of two or more colours are arranged with two or more sets of the light collecting devices such that each set of light collecting devices collects light of a different colour.

The light sources may be arranged on a disc in a spiral shape, with one or more spirals, such that a raster type illumination is produced.

Alternatively, the light sources may be arranged on a disc in a spiral shape, with more than one spiral, the spirals containing light sources of different colours such that scrolling colour illumination is produced.

Alternatively, the light sources may be arranged in a helical pattern on a drum, with one or more helices such that a raster-type illumination is produced.

Alternatively, the light sources may be arranged in the form of one or more helices, with each helix being of a different colour, such that scrolling colour illumination is produced.

The illumination apparatus may include a switchable holographic mirror, the illumination apparatus then being one in which the light source or sources and/or the light collecting device or devices appear to move by use of the switchable holographic mirror.

The present invention also extends to a projector when provided with the illumination apparatus.

BRIEF DESCRIPTION OF THE DRAWINGS

Embodiments of the invention will now be described solely by way of example and with reference to the accompanying drawings in which.

DETAILED DESCRIPTION OF THE DRAWINGS

Figure 1:
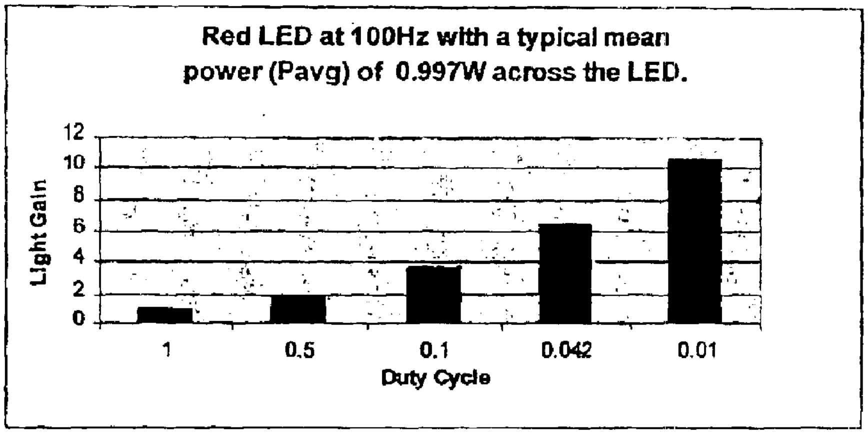
FIG. 1 illustrates light gain against duty cycle for a red light emitting diode.
Figure 2:
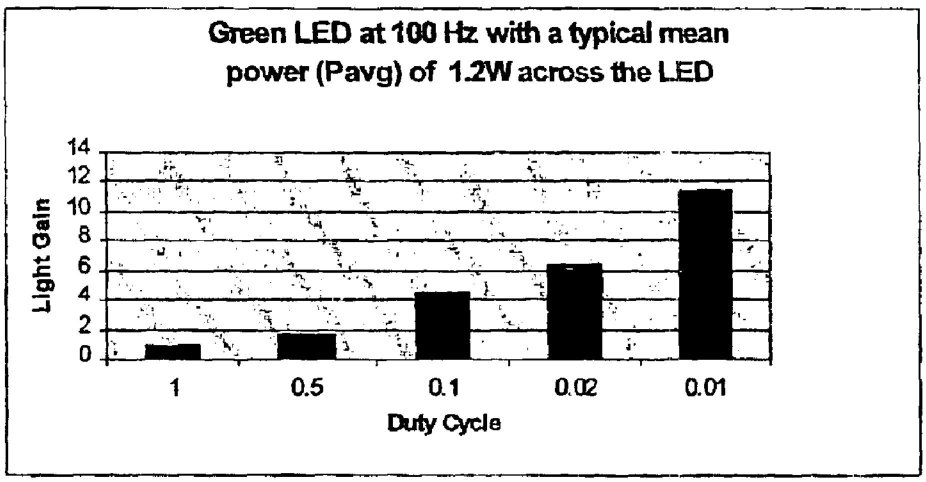
FIG. 2 illustrates light gain against duty cycle for a green light emitting diode.
Figure 3:
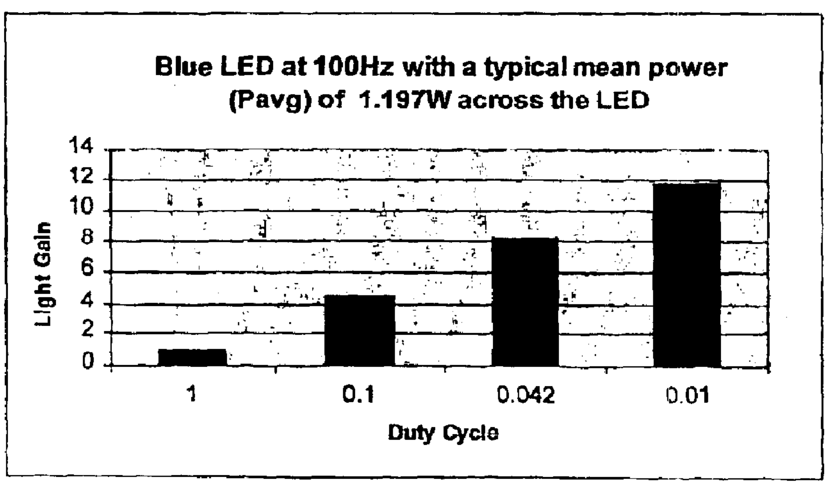
FIG. 3 illustrates light gain against duty cycle for a blue light emitting diode.

Referring to FIGS. 1, 2 and 3, light emitting diodes provide light sources which are small in size, and which have an extremely long life, a low power consumption, and the ability of being colour specific. Recently, light emitting diodes have become available that can emit up to or greater than 25 lumens. Even so, an output of approximately 25 lumens is too little to be of use in most projects. However, if a light emitting diode is flashed for a shorter duration of time with higher peak currents through the light emitting diode compared to average values for continuous illumination, many times higher outputs may be achieved as shown in FIG. 1, 2 and 3. Increase in temperature can decrease the efficiency of the light emitting diodes, and therefore additional cooling mechanisms can be included in order to maintain the efficiency of the light emitting diodes.

If a light emitting diode is flashed very brightly, the eye will integrate the brightness to the time-averaged amount. However, if a method could be devised to place light emitting diodes sequentially in a single position at which point they flash very brightly, the time-averaged brightness of this point will be higher than that produced by any one light emitting diode. This is achieved by moving the light emitting diodes and the light collecting device or devices with respect to each other. This movement may be achieved by mounting the light emitting diodes and/or the light collecting device or devices on a revolving disc, wheel, drum or belt. The light emitting diodes are timed to flash as they pass the light collecting device or devices. This would be true for any light source, which can be flashed at a higher intensity than when operating in a continuous mode.

By introducing relative movement between the light source and the light collecting device, and by flashing and superimposing the flashes, it is possible to achieve a many times higher instantaneous and average light output. Further, by using light emitting diodes as the light sources, faster modulation of light and major reduction in power consumption in some applications is also achievable. These applications may be suitable for modern day illumination apparatus applications including those based on LCOS technology requiring accurately shaped pulses for variable durations in one single frame.

The illumination apparatus of the present invention is able to provide illumination of greater brightness and with a low etendue. Light emitting diodes are narrow band light sources, and when used in the illumination apparatus of the present invention, they have the advantage of producing improved contrast with a wider colour gamut.

Figure 4:
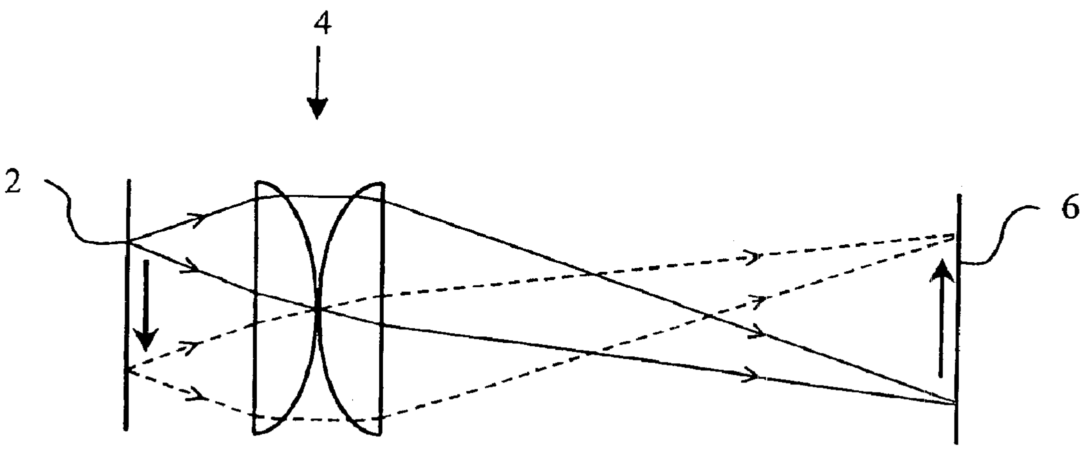
FIG. 4 illustrates movement of a light source relative to a light collecting device.

Referring now to FIG. 4, the illumination apparatus of the present invention may be advantageous where there is movement of the light source. The movement can be uniform or of an indexed nature such that the light source is paused in front of the light collecting device. The relative movement can be used to replace known processes in illumination apparatus that utilise other means. The illumination apparatus of the present invention can produce a three colour light source, for use in three panel illumination apparatus, field sequential colour and scrolling colour for use in single panel illumination apparatus. Scanning or raster-type illumination can be produced, which can be used for smear suppression, replacing known shuttering techniques. FIG. 4 illustrates that when a light source 2 is moved relative to a light collecting device 4, then the light incident on a panel 6 also moves. If the light source 2 is passing in front of the light collecting device 4 and subsequent light sources pass at a lower level, then a raster-type illumination is produced.

Figure 5:
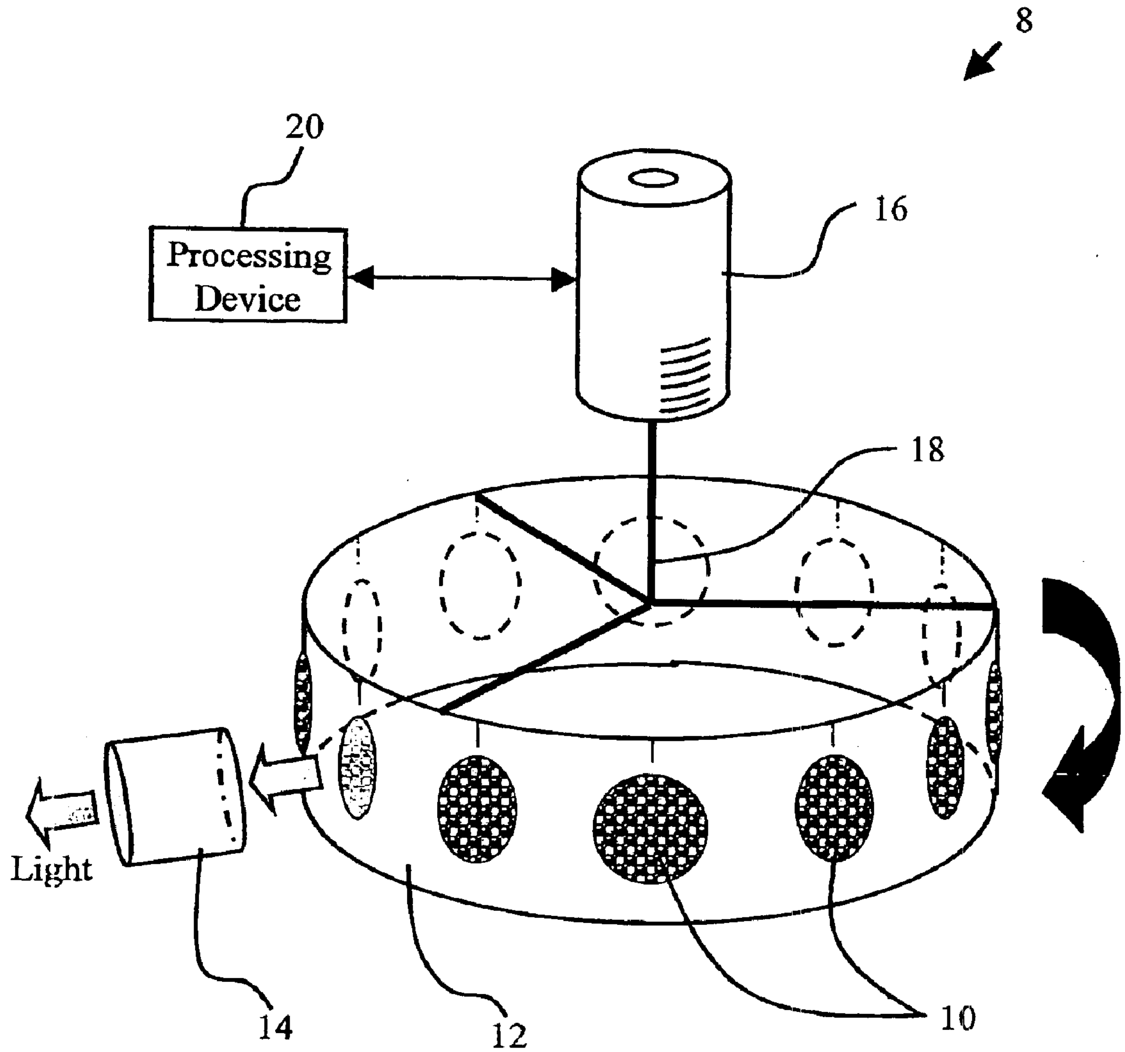
FIG. 5 shows light sources mounted on a rotating drum.

FIG. 5 shows illumination apparatus 8 in which light sources 10 are mounted on a rotating drum 12 with respect to a stationary light collecting device 14. The drum 12 is attached to a motor 16 and it rotates about an axis 18. A processing device 20 is used to regulate the relative position and velocity of the light sources 10 and the light collecting device 14. The processing device 20 may also provide and modulate the power.

Figure 6:
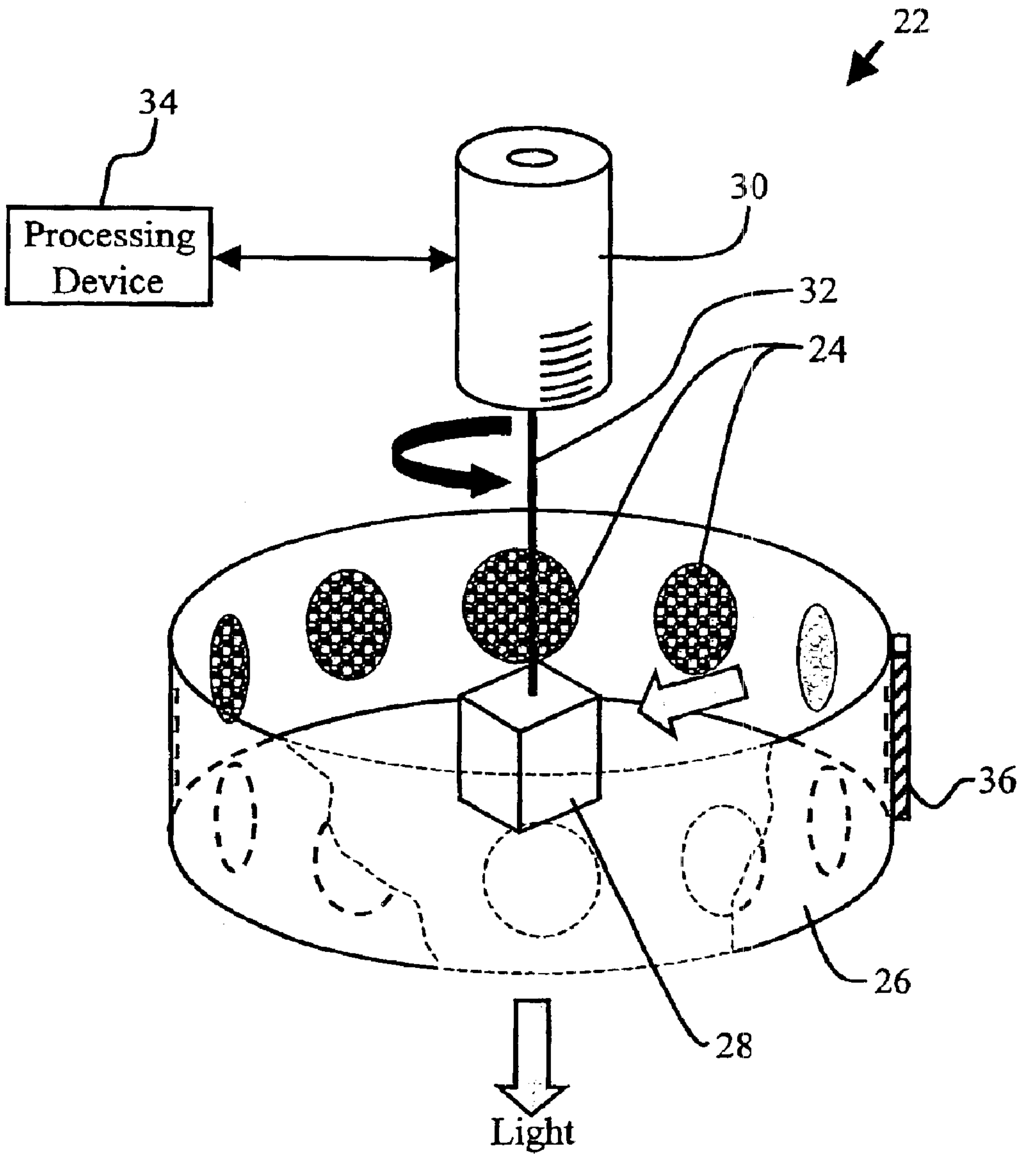
FIG. 6 shows a low etendue light emitting diode light source.

FIG. 6 shows illumination apparatus 22 in which light sources 24 are mounted on a stationary drum 26 with respect to a light collecting device 28. The light collecting device 28 is attached to a motor 30 and rotates about an axis 32. A processing device 34 is shown. The processing device 34 may be used to regulate the relative position and velocity of the light sources 24 and the light collecting device 28. The processing device 34 may also provide the power. In order to improve the efficiency of the light sources 24, a cooling device 36 may be used.

Figure 7:
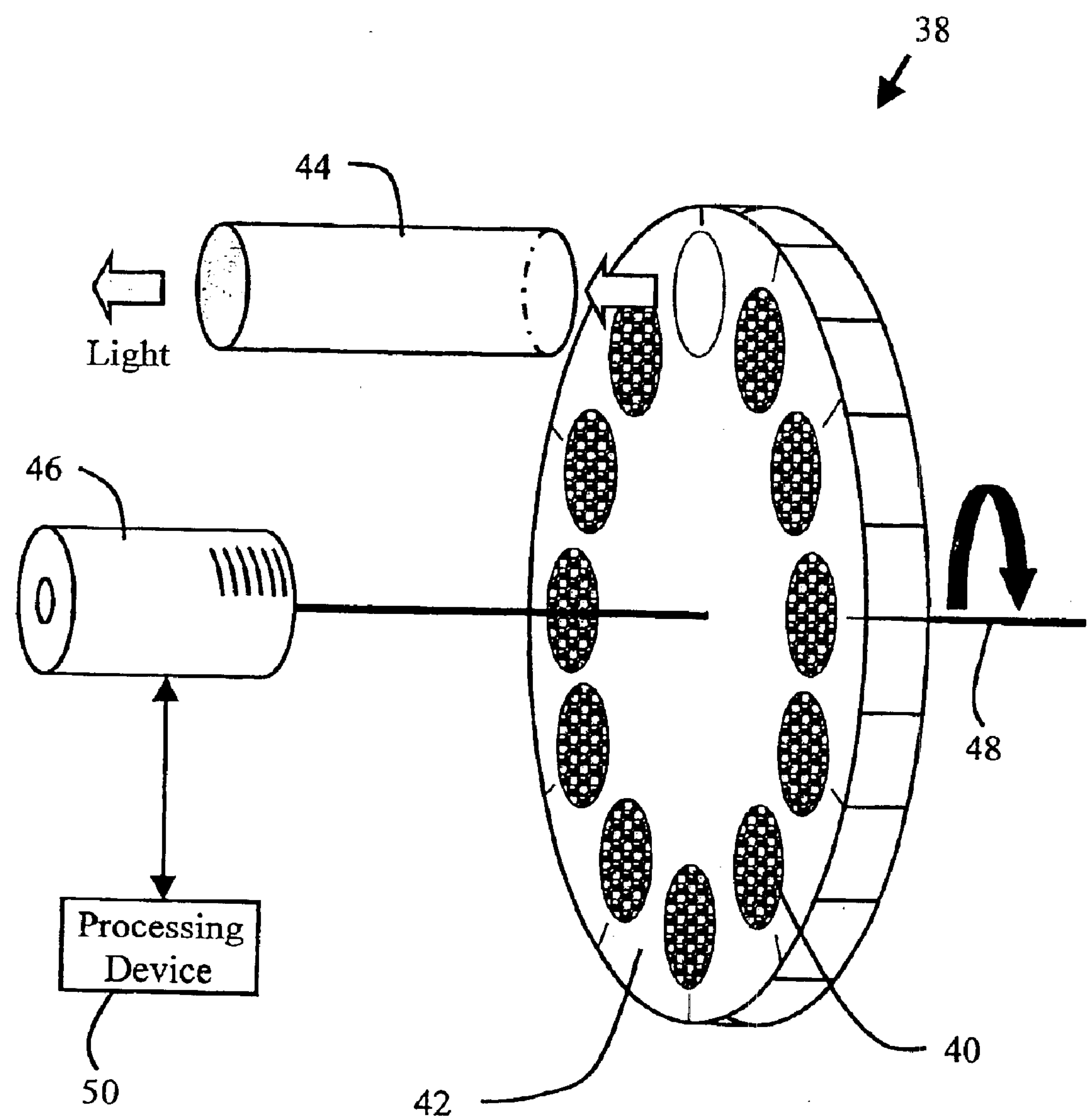
FIG. 7 shows light sources on a disc.

FIG. 7 shows illumination apparatus 38 in which light sources 40 are placed on a disc 42 with respect to a stationary light collecting device 44. The disc 42 is attached to a motor 46 and rotates about an axis 48. A processing device 50 is used to regulate the relative position and velocity of the light sources 40 and the light collecting device 46. The processing device 50 may also be used to provide and regulate the power.

Figure 8:
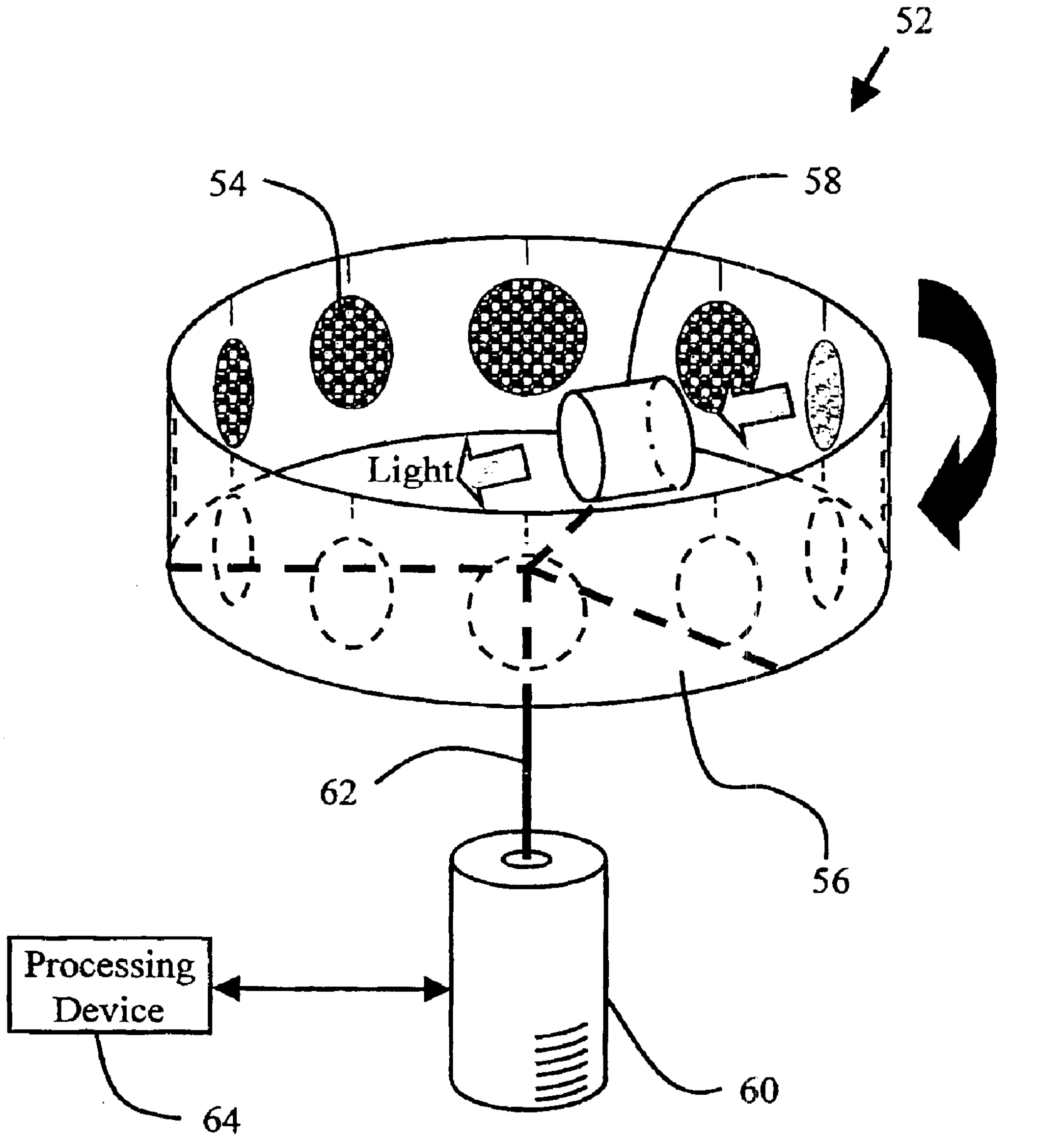
FIG. 8 shows light sources on a drum.

FIG. 8 shows illumination apparatus 52 in which light sources 54 are placed on a drum 56 with respect to a stationary light collecting device 58. The stationary light collecting device 58 is placed on the inside of the drum 56. The drum 56 is attached to a motor 60 and it rotates about an axis 62. A processing device 64 is used to regulate the relative position and velocity of the light sources 54 and the light collecting device 58. The processing device 64 may also provide and regulate the power.

In the illumination apparatus shown in FIGS. 5–8, the light sources may face inwards or outwards, depending upon the position of the light collecting device. Furthermore, the light sources and the light collecting device may move in the same or opposite direction.

Figure 9:
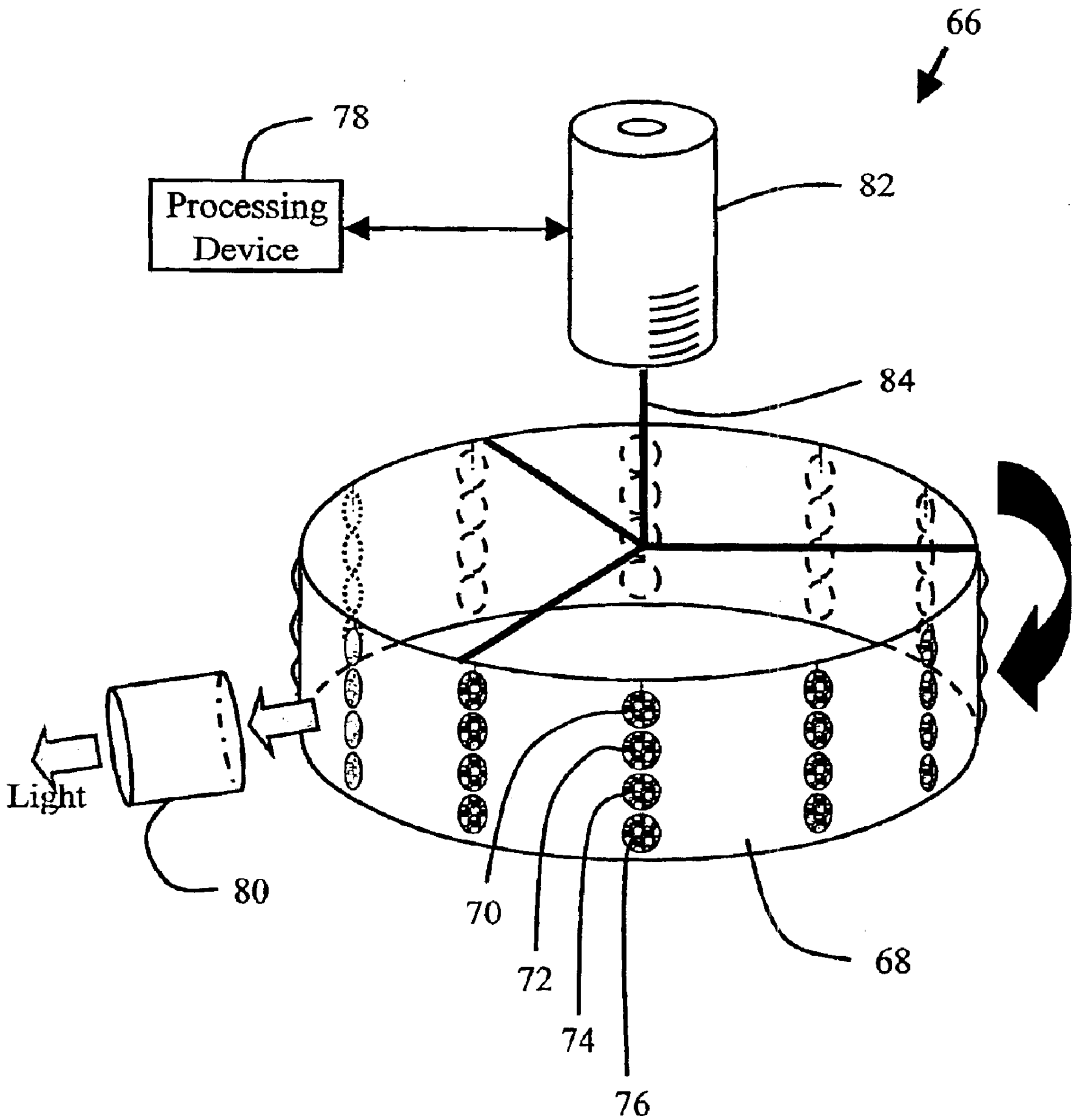
FIG. 9 shows light sources on a drum, with the light sources being mounted in sets.

In the illumination apparatus of the present invention, it is also possible to have more than one light emitting diode flashing at one time. It is further possible to have more than one light collecting device set. The amount of light collected from each light collecting device set can be controlled by controlling the area of the light collecting devices that are exposed to the flashing light source. FIG. 9 shows illumination apparatus 66 utilising a drum 68. Light sources 70, 72, 74, 76 are mounted in sets as shown with respect to a stationary light collecting device 80, such that one row of the light sources flashes together. A processing device 78 is used to regulate the relative position and velocity of the light sources 70, 72, 74, 76 and the light collecting device 80. The processing device 78 may also provide and regulate the power. The drum 68 is connected to a motor 82 and rotates about an axis 84.

Figure 10:
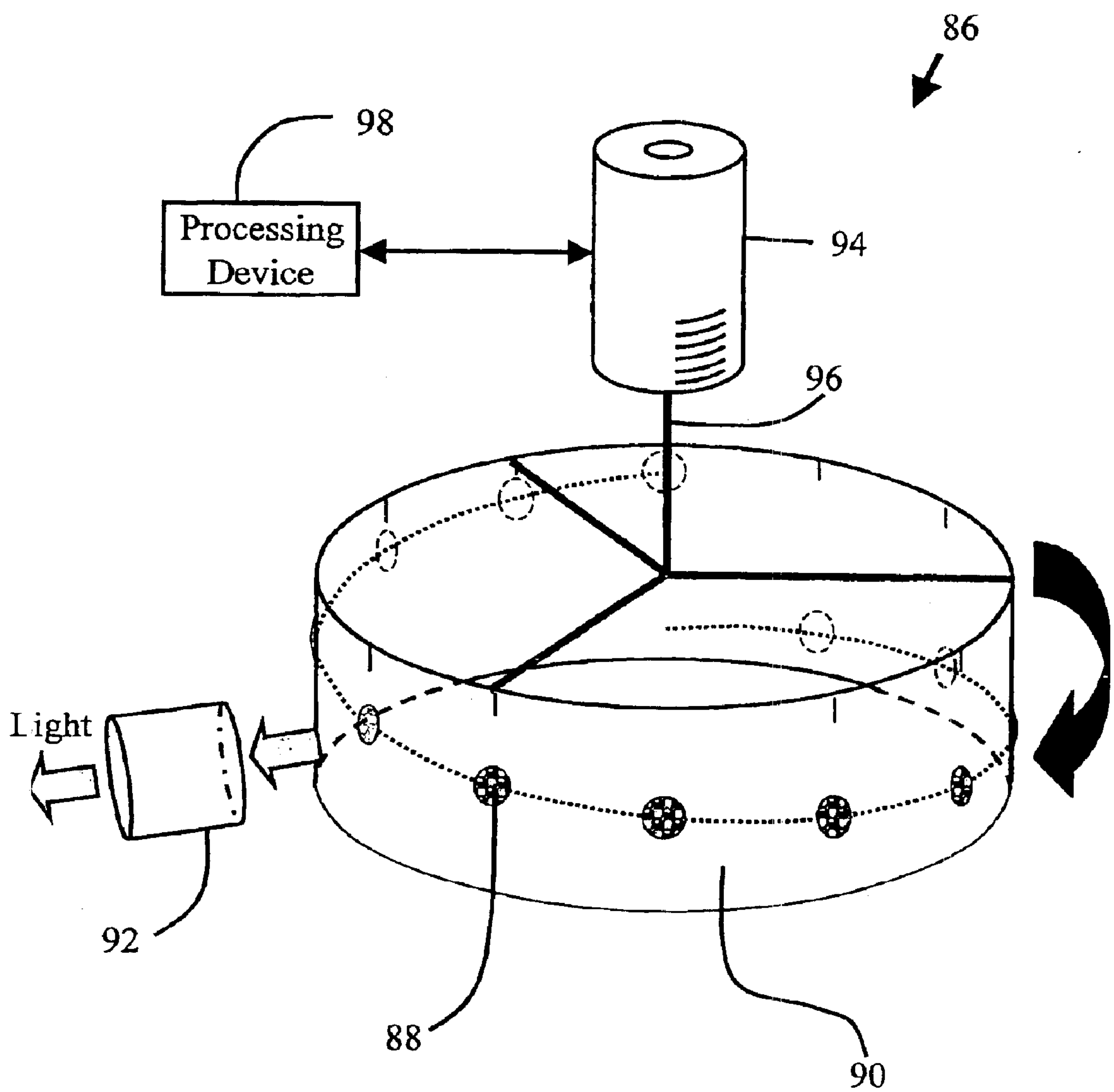
FIG. 10 shows light sources mounted in a certain pattern to achieve various shapes.

Referring now to FIG. 10, there is shown illumination apparatus 86 in which light sources 88 are mounted in a certain pattern in order to achieve various shapes. More specifically, the light sources 88 are mounted in a helix on a drum 90 with respect to a stationary light collecting device 92. The drum 90 is attached to a motor 94 and rotates about an axis 96. A processing device 98 is used to regulate the relative position and velocity of the light sources 88 and the light collecting device 92. The processing device 98 may also used, to provide and regulate the power. The illumination apparatus 86 produces a raster-type illumination.

Figure 11:
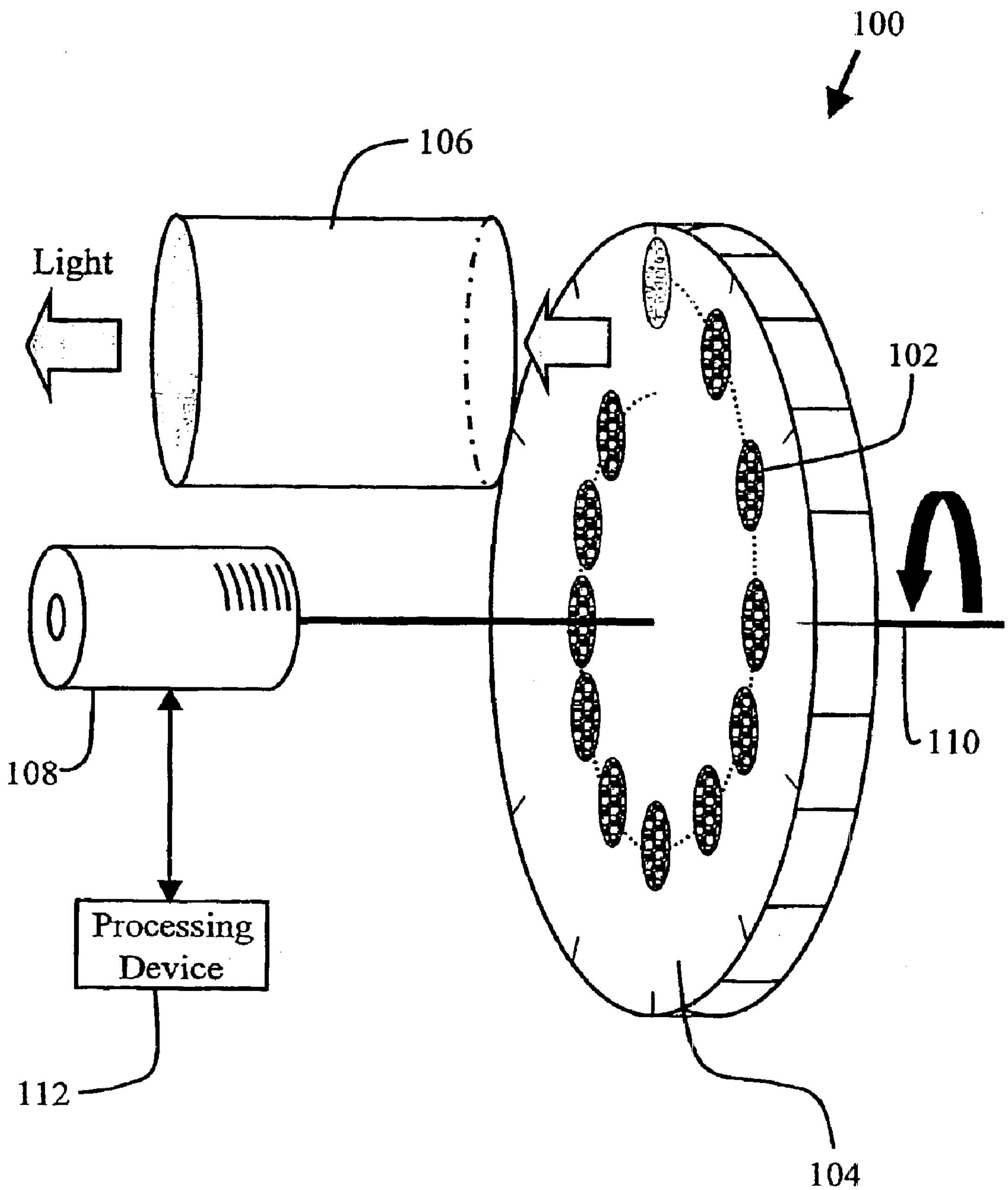
FIG. 11 shows light sources mounted in a spiral on a disc.

Referring now to FIG. 11, there is shown illumination apparatus 100 in which light sources 102 are mounted in a spiral on a disc 104 with respect to a stationary light collecting device 106. The disc 104 is attached to a motor 108 and rotates about an axis 110. A processing device 112 is used to regulate the relative position and velocity of the light sources 102 and the light collecting device 106. A processing device 112 may also provide and regulate the power. The illumination apparatus 100 produces a raster-type illumination.

Figure 12:
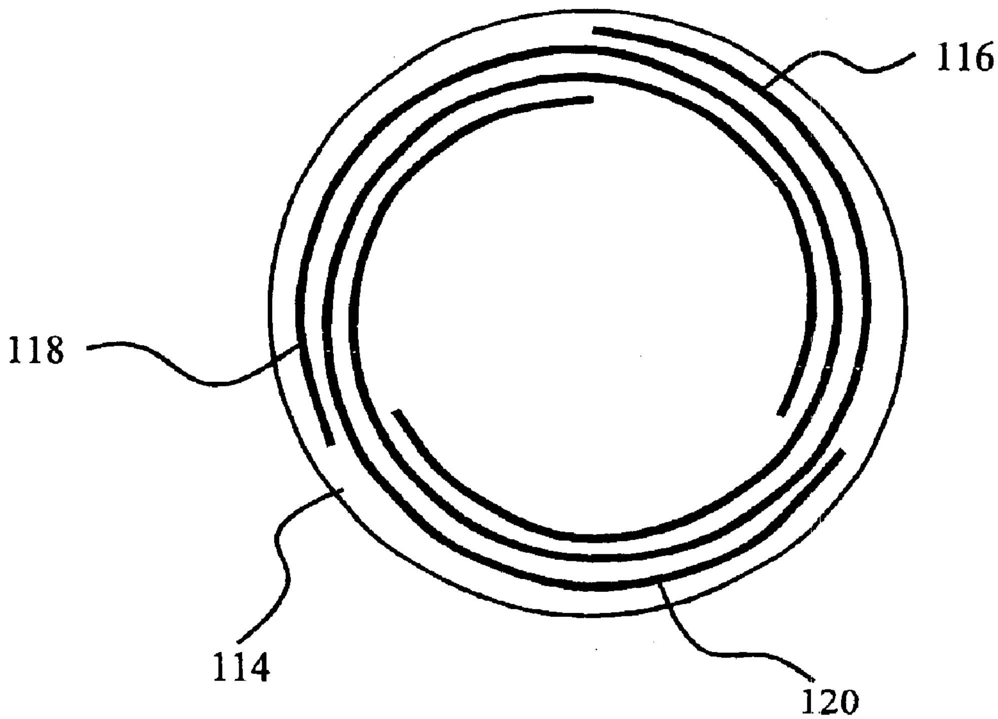
FIG. 12 shows light sources mounted on a disc, with the light sources arranged in concentric spirals.

FIG. 12 illustrates how light sources can be mounted on a disk 114 and arranged in more or more concentric spirals. The illustrated spirals consist of different coloured light sources, with the spiral 116 being red, the spiral 118 being green, and the spiral 120 being blue. The arrangement shown in FIG. 12 will produce a scrolling colour illumination source for use in appropriate illumination apparatus applications. Other configurations such as spirals and helices on a drum will produce raster-type illumination sources.

Figure 13:
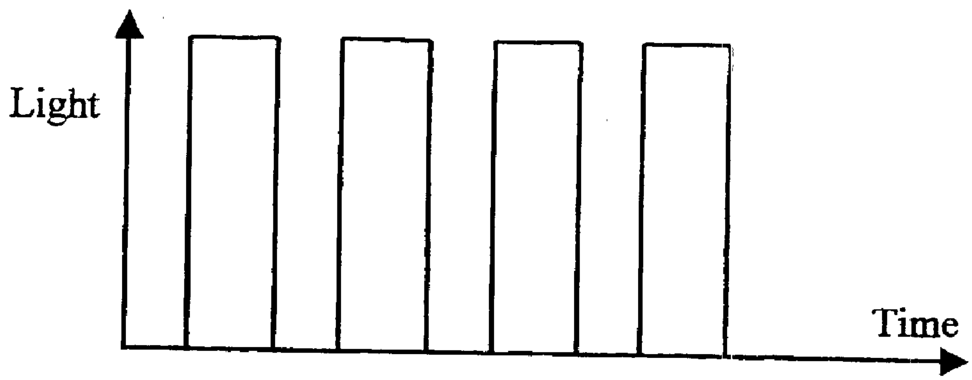
FIG. 13 shows a pulsed wave form in the shape of a square wave.

FIG. 13 shows a pulsed-wave form in the shape of a square wave.

Figure 14:
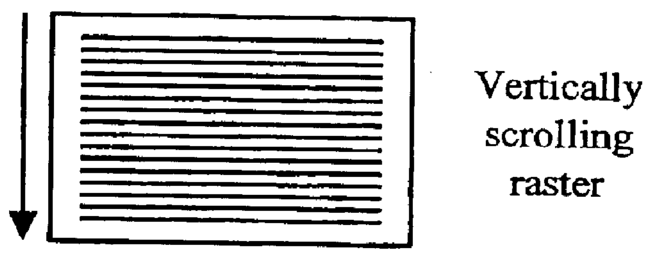
FIG. 14 shows a vertically scrolling raster.

FIG. 14 shows a vertically scrolling raster-like pattern.

Figure 15:
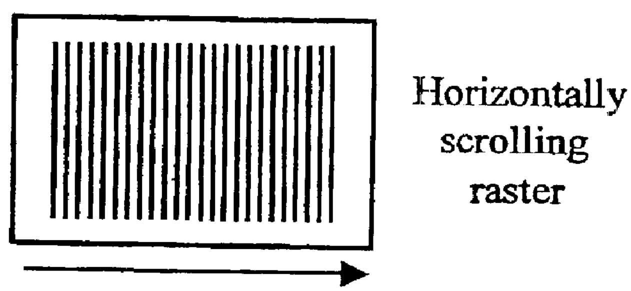
FIG. 15 shows a horizontally scrolling raster.

FIG. 15 shows a horizontally scrolling raster-like pattern.

Figure 16:
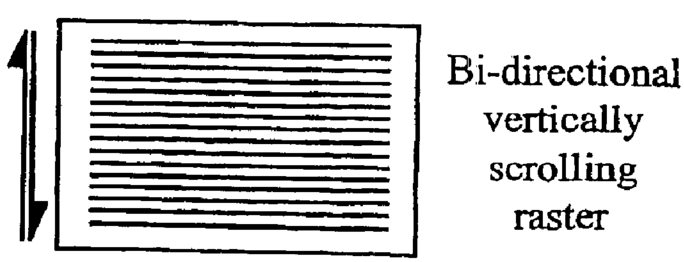
FIG. 16 shows a bi-directional vertically scrolling raster.

FIG. 16 shows a bi-directional vertically scrolling raster-like pattern.

It is to be appreciated that the embodiments of the invention described above with reference to the accompanying drawings have been given by way of example only and that modifications may be effected. Thus, for example, the various embodiments of the present invention may include physical motion means for providing physical motion between the light sources and the light collecting or devices. Arrangements can also be used whereby the relative motion is a virtual motion created by a switchable holographic mirror, giving the effect of movement of the light collecting device or devices. The illumination apparatus can be used for applications other than projectors. Such applications may be, for example, as a back light for a light crystal display, a light emitting diode display panel, or any application where increased light output is required.

What is claimed is:

1. Illumination apparatus which comprises at least two light sources, at least one light collecting device for collecting light from the light sources, motion providing means for providing relative motion between the light sources and the light collecting device, and control means for controlling the illumination of the light sources such that the light sources are illuminated for a predetermined time period when in a predetermined position relative to the light collecting device, and such that the light sources are illuminated for a fraction of a cycle time with a drive current greater than the average forward current for the light sources when illuminated continuously.

2. Illumination apparatus according to claim 1 in which the light sources are stationary, and in which the light collecting device is moveable relative to the stationary light sources.

3. Illumination apparatus according to claim 1 in which the light collecting device is stationary, and in which the light sources are moveable relative to the stationary light collecting device.

4. Illumination apparatus according to claim 1 in which the light sources and the light collecting device are both moveable in either the same direction or in opposite directions.

5. Illumination apparatus according to claim 1 in which the light sources are arranged on means selected from the group consisting of a drum, a disc, and a belt.

6. Illumination apparatus according to claim 1 in which the light sources are each a light emitting diode.

7. Illumination apparatus according to claim 1 in which the light sources produce light of the same colour.

8. Illumination apparatus according to claim 1 in which the light sources produce light of different colours.

9. Illumination apparatus according to claim 8 in which the light sources produce light of different colours, and in which the light sources are arranged according to a type of panel used in the illumination apparatus in order to provide sequentially coloured light.

10. Illumination apparatus according to claim 8 in which the light sources of two or more colours are arranged with two or more sets of the light collecting devices such that each set of the light collecting devices collects light of a different colour.

11. Illumination apparatus according to claim 1 in which the light sources are arranged on a disc in a spiral shape, with one or more spirals, such that a raster-type illumination is produced.

12. Illumination apparatus according to claim 1 in which the light sources are arranged on a disc in a spiral shape, with more than one spiral, the spirals containing light sources of different colours such that scrolling colour illumination is produced.

13. Illumination apparatus according to claim 1 in which the light sources are arranged in a helical pattern on a drum, with one or more helices, such that a raster-type illumination is produced.

14. Illumination apparatus according to claim 1 in which the light sources are arranged in the form of one or more helices, with each helix being of a different colour, such that scrolling colour illumination is produced.

15. Illumination apparatus according to claim 1 and including a switchable holographic mirror, and in which the light source or sources and/or the light collecting device or devices appear to move by use of the switchable holographic mirror.

* * * * *